US009977267B2

(12) United States Patent
Grundhofer (10) Patent No.: US 9,977,267 B2
(45) Date of Patent: May 22, 2018

(54) SELECTIVELY ACTIVATED COLOR CHANGING HAIRPIECE

(71) Applicant: Disney Enterprises, Inc., Burbank, CA (US)

(72) Inventor: Anselm Grundhofer, Greifensee (CH)

(73) Assignee: DISNEY ENTERPRISES, INC., Burbank, CA (US)

( * ) Notice: Subject to any disclaimer, the term of this patent is extended or adjusted under 35 U.S.C. 154(b) by 114 days.

(21) Appl. No.: 14/574,885

(22) Filed: Dec. 18, 2014

(65) Prior Publication Data

US 2016/0174644 A1     Jun. 23, 2016

(51) Int. Cl.
*A41G 5/00* (2006.01)
*G02F 1/01* (2006.01)
*A41G 3/00* (2006.01)

(52) U.S. Cl.
CPC ............ *G02F 1/0126* (2013.01); *A41G 3/00* (2013.01)

(58) Field of Classification Search
CPC .. A41G 5/00; A41G 5/004; A41G 3/00; F21S 10/02; F21S 2/00; F21S 10/002; F21S 10/005; F21S 10/007; A63H 33/22; A63H 3/006
USPC ......................................... 359/244, 241, 242
See application file for complete search history.

(56) References Cited

U.S. PATENT DOCUMENTS

| 3,450,872 | A | * | 6/1969 | Aiello, Jr. | F21L 7/00 362/104 |
| 3,675,005 | A | * | 7/1972 | Curiel | A44C 15/0015 116/DIG. 5 |
| 3,758,771 | A | * | 9/1973 | Frohardt | A44C 15/0015 116/DIG. 5 |
| 5,277,644 | A | * | 1/1994 | Osborne | A63H 3/006 446/219 |
| 5,373,392 | A | * | 12/1994 | Bala | G02F 1/0126 359/241 |
| 5,575,552 | A | * | 11/1996 | Faloon | B60Q 3/0226 359/839 |
| 6,080,034 | A | * | 6/2000 | Bennett Harris | G09B 23/36 434/267 |
| 7,547,109 | B2 | * | 6/2009 | Schmidt | A63H 33/22 362/118 |
| 2003/0140934 | A1 | * | 7/2003 | Sugai | A41G 3/0083 132/53 |

(Continued)

FOREIGN PATENT DOCUMENTS

JP      2001226812 A  *  8/2001

OTHER PUBLICATIONS

Ubergizmo, "Lady Gaga's illuminated wig makes her a bright pop star", http://www.ubergizmo.com/2012/10/lady-gagas-illuminated-wig-makes-her-a-bright-pop-star/ [retrieved from the Internet on Oct. 13, 2016], Oct. 4, 2012, 2 Pages.

*Primary Examiner* — Rachel Steitz
(74) *Attorney, Agent, or Firm* — Dorsey & Whitney LLP (57) ABSTRACT

A color-changing hairpiece is disclosed. The hairpiece may include a plurality of elongated light sources that emit light when activated and a photochromic layer provided in association with at least one light source such that the light emitted from the at least one light source impinges on a portion of the photochromic layer, the photochromic layer configured to change color responsive to the light emitted from the at least one light source.

20 Claims, 11 Drawing Sheets

(56) References Cited

U.S. PATENT DOCUMENTS

| | | | |
|---|---|---|---|
| 2004/0135097 A1* | 7/2004 | Shibahashi | A63H 33/22 250/474.1 |
| 2012/0243224 A1* | 9/2012 | Kuwaharada | G02B 3/04 362/237 |
| 2013/0134056 A1* | 5/2013 | Buynak | B65D 75/367 206/223 |
| 2013/0208201 A1* | 8/2013 | Satoh | G02F 1/1334 349/33 |
| 2014/0194036 A1* | 7/2014 | Heller | A63H 33/22 446/485 |

* cited by examiner

SELECTIVELY ACTIVATED COLOR CHANGING HAIRPIECE

FIELD

The present invention relates generally to a color-changing wig or other hairpiece, and more specifically to wig or other hairpiece having a photochromic property triggered by a light source integrated within the wig.

BACKGROUND

Wigs or other artificial hairpieces are used in many settings. For example, actors and actresses may wear wigs for certain roles in a dramatic performance. Pop stars and other vocalists may wear wigs on stage during a concert or other performance. Some wigs may be used merely for the purpose of giving the appearance of hair or a hair style that is not otherwise possible with wearer's natural hair. Other wigs may feature some special effect that allows the wearer or other person to change the wig's appearance in some way. For example, some wigs include colored lights or like that may be activated to make the wig glow or otherwise emit light. Other special effect wigs include those that have been treated with a florescent chemical or other compound that causes the wig to glow when illuminated by an external light source.

Typically, these special effect features are included in a wig to give the wig a kind of flair that is valued for its artificiality or garishness. Even when this is not the intention, existing special effects still tend to give a wig an unnatural appearance. For example, florescent wigs may be used with the intention of having a bright or otherwise noticeable appearance that mimics a natural hair color. However, these wigs typically glow with an artificial and emissive color tone that tends to give the wig an unnatural appearance. As an additional drawback, the color effect featured in these wigs is typically triggered by the light source that otherwise illuminates the wig. Thus, the environment in which such a wig is used must be tightly controlled such that only lights having the specific frequency that triggers the color effect are used. Thus, the other objects in the environment must be selected such that they do not interact with the triggering light in an unwanted or negative manner.

Accordingly, while some existing wigs do feature certain special effects, these existing wigs do not feature special color effects that still maintain a natural appearance in the hair of the wig. Further, while some existing wigs do change color, these wigs typically have an artificial glowing appearance and/or must be used in a controlled environment where special lighting is used to illuminate the wig. It is with these shortcomings in mind that the present invention has been developed.

SUMMARY

One embodiment of the present disclosure may take the form of a hairpiece that includes a plurality of elongated light sources that emit light when activated and a photochromic layer provided in association with at least one light source such that the light emitted from the at least one light source impinges on a portion of the photochromic layer, the photochromic layer configured to change color responsive to the light emitted from the at least one light source.

Another embodiment of the present disclosure may take the form of a wig that includes a plurality of elongated light sources that emit light when activated; a wearable cap portion through which first ends of at least the plurality of elongated light sources are interconnected; and a photochromic layer provided in association with at least one light source such that the light emitted from the at least one light source impinges on a portion of the photochromic layer, the photochromic layer configured to change color responsive to the light emitted from the at least one light source.

Another embodiment of the present disclosure may take the form of a method that includes externally illuminating a hairpiece with light having a first range of frequencies; reflecting the external light from the hairpiece so as to produce a first color; activating a photochromic dye associated with the hairpiece by illuminating individual strands of the hairpiece with a light source integrated with the hairpiece, the light source producing light having a second range of frequencies; and reflecting the external light from the hairpiece while the individual strands are illuminated by the light source integrated with the hairpiece so as to produce a second color.

SPECIFICATION

Overview

The present disclosure is related to a wig or other hairpiece that changes color in response to electromagnetic radiation generated from light sources integrated within the hairpiece. The color-changing hairpiece may be worn, for example, by an actress in a stage play or other live performance. The color-changing feature of the hairpiece may be used to change the actress's hair color when the stage play calls for such a change. Because the color-changing hairpiece is used, the transition between hair colors may occur quickly because the actress does not need to exit the stage and exchange wigs or other hairpieces. The light sources integrated within the hairpiece may be configured to emit light having a frequency spectrum that triggers a photochromic feature of the hairpiece, while this triggering frequency spectrum may be excluded from the stage lights or other lights that illuminate the hairpiece. Thus, the internal light sources may operate change the color of the hairpiece whether or not the stage lights are illuminated. While certain hairpiece embodiments are discussed in connection with stage plays or other performances, it should be appreciated that wigs or hairpieces in accordance this disclosure may be used in other contexts.

An example color-changing hairpiece may include a photochromic feature that may take the form of a photochromic dye or other compound integrated within the hairpiece. In some implementations, the photochromic dye is applied to various hair strands of the hairpiece so as to form an outer layer of the hair strands. The light sources that are integrated within the hairpiece may take the form of thin elongated light pipes or light guides that are interwoven with the hair strands. The light sources emit light at their ends and/or along their lengths, and the emitted light impinges on the photochromic dye to trigger the photochromic feature of the hairpiece. In other implementations, the photochromic dye is applied to the elongated light sources themselves such that the light guides form color-changing hair strands of the hair piece.

In one embodiment, the color-changing hairpiece may take the form of a wig. The wig may include a plurality of elongated light sources that emit light when activated. The wig may also include a wearable cap portion through which ends of the elongated light sources are interconnected. A photochromic layer may be provided in association with at least one of the elongated light source such that the light emitted from the at least one light source impinges on a portion of the photochromic layer. The photochromic layer may be configured to change color responsive to the light emitted from the at least one light source.

DETAILED DESCRIPTION

Figure 1A:
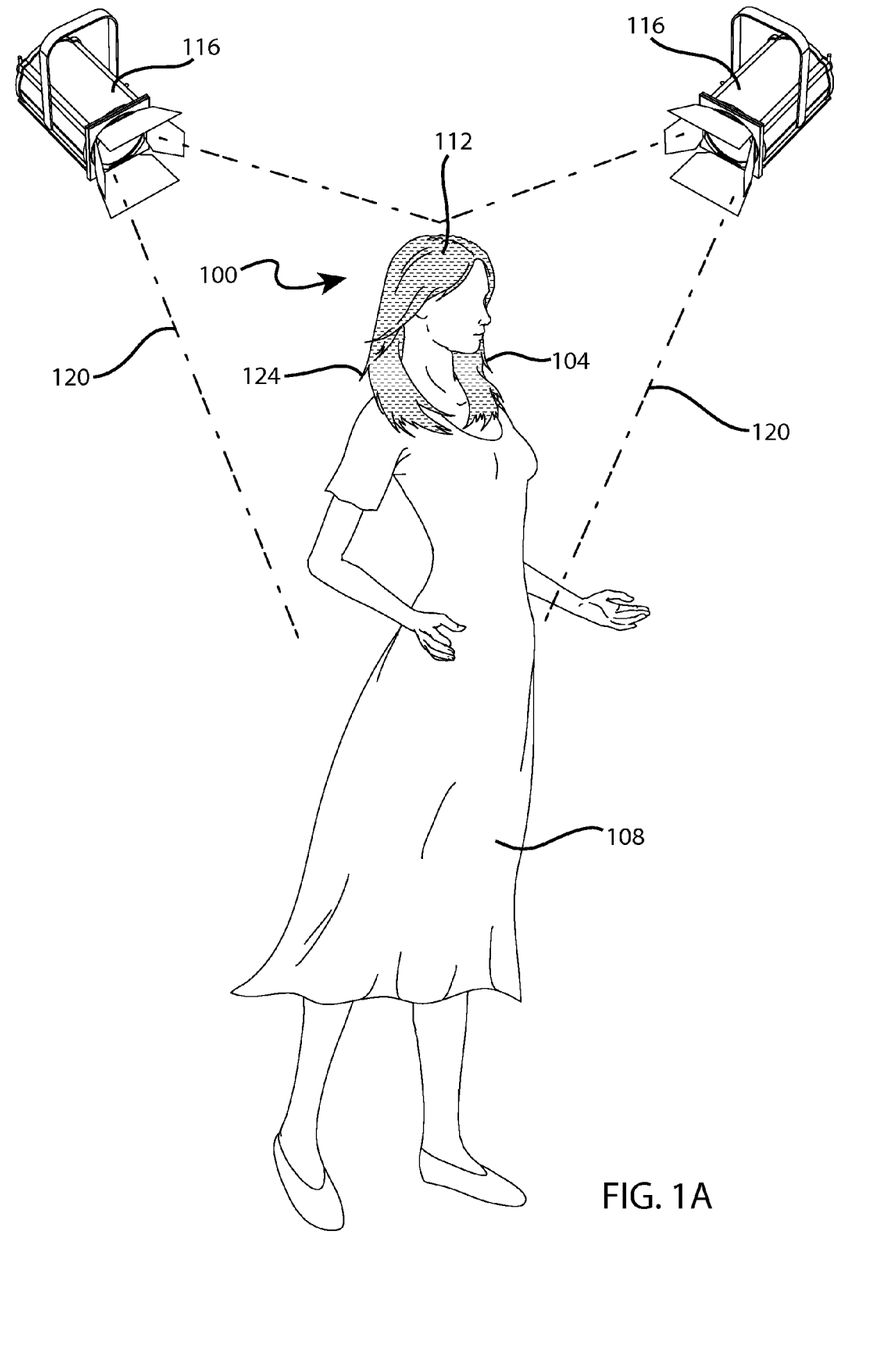
FIGS. 1A and 1B are perspective views of a hairpiece in accordance with the present disclosure as worn by a person.
Figure 1B:
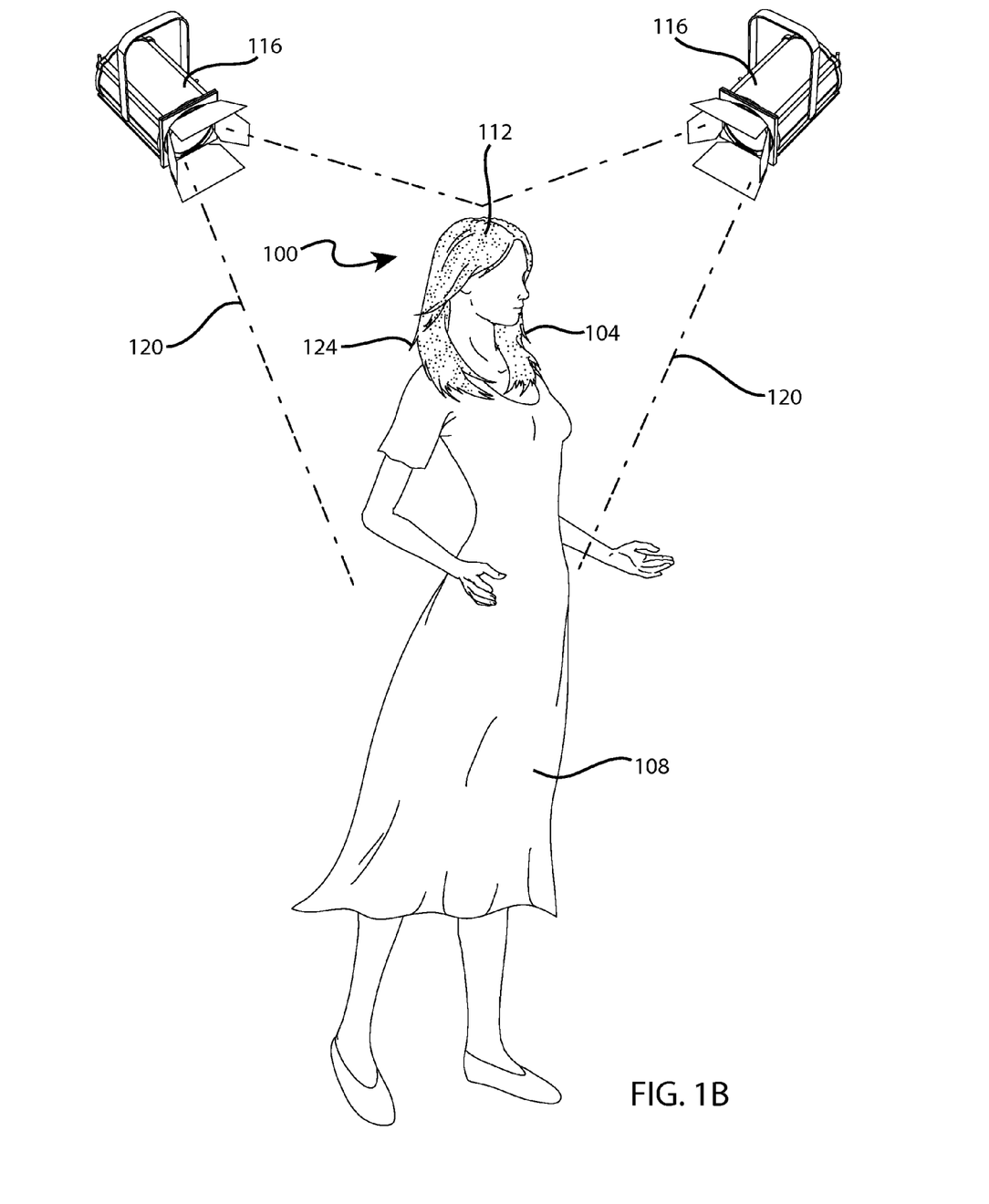
Figure 2A:
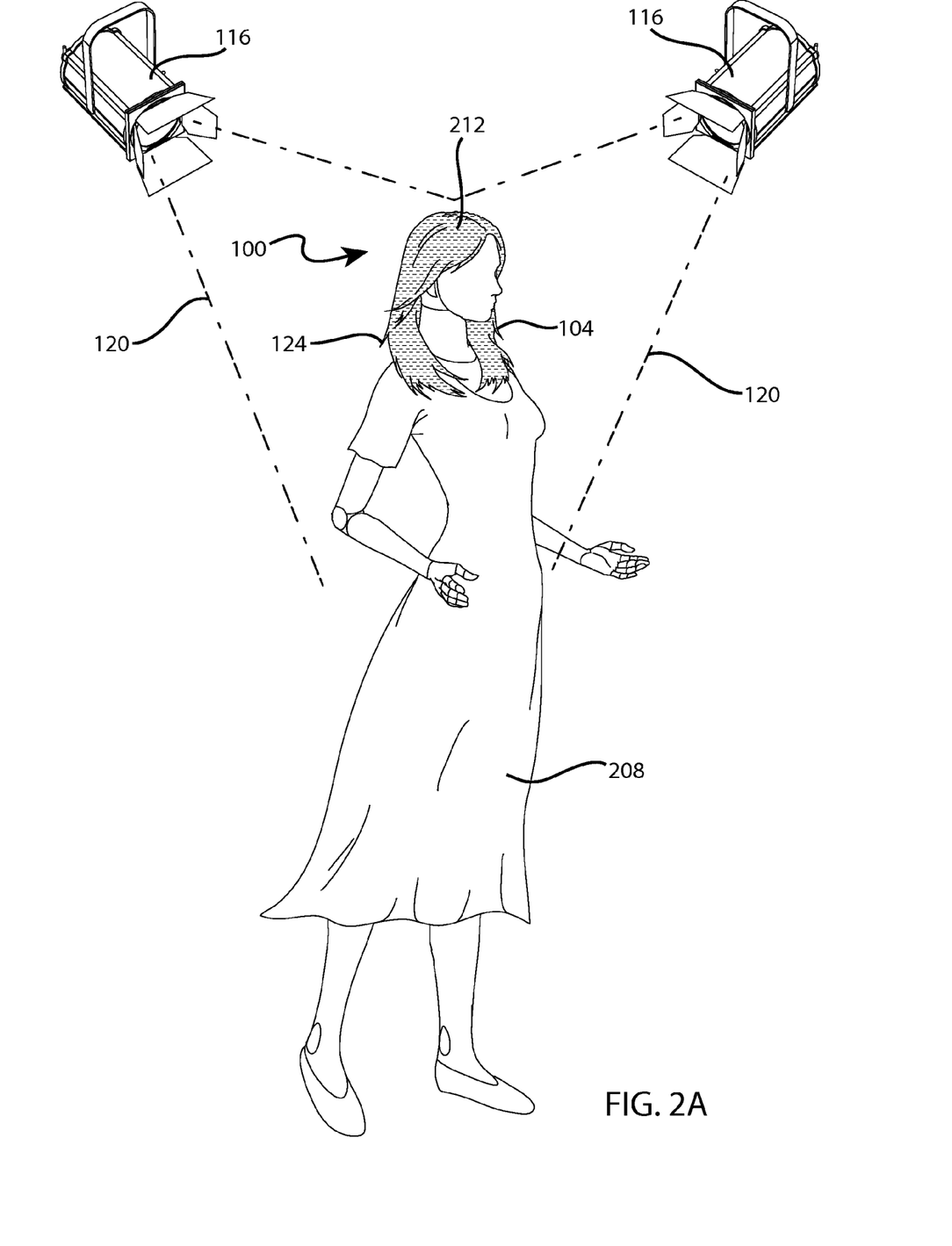
FIGS. 2A and 2B are perspective views of a hairpiece in accordance with the present disclosure as worn by a mannequin or animatronic character.
Figure 2B:
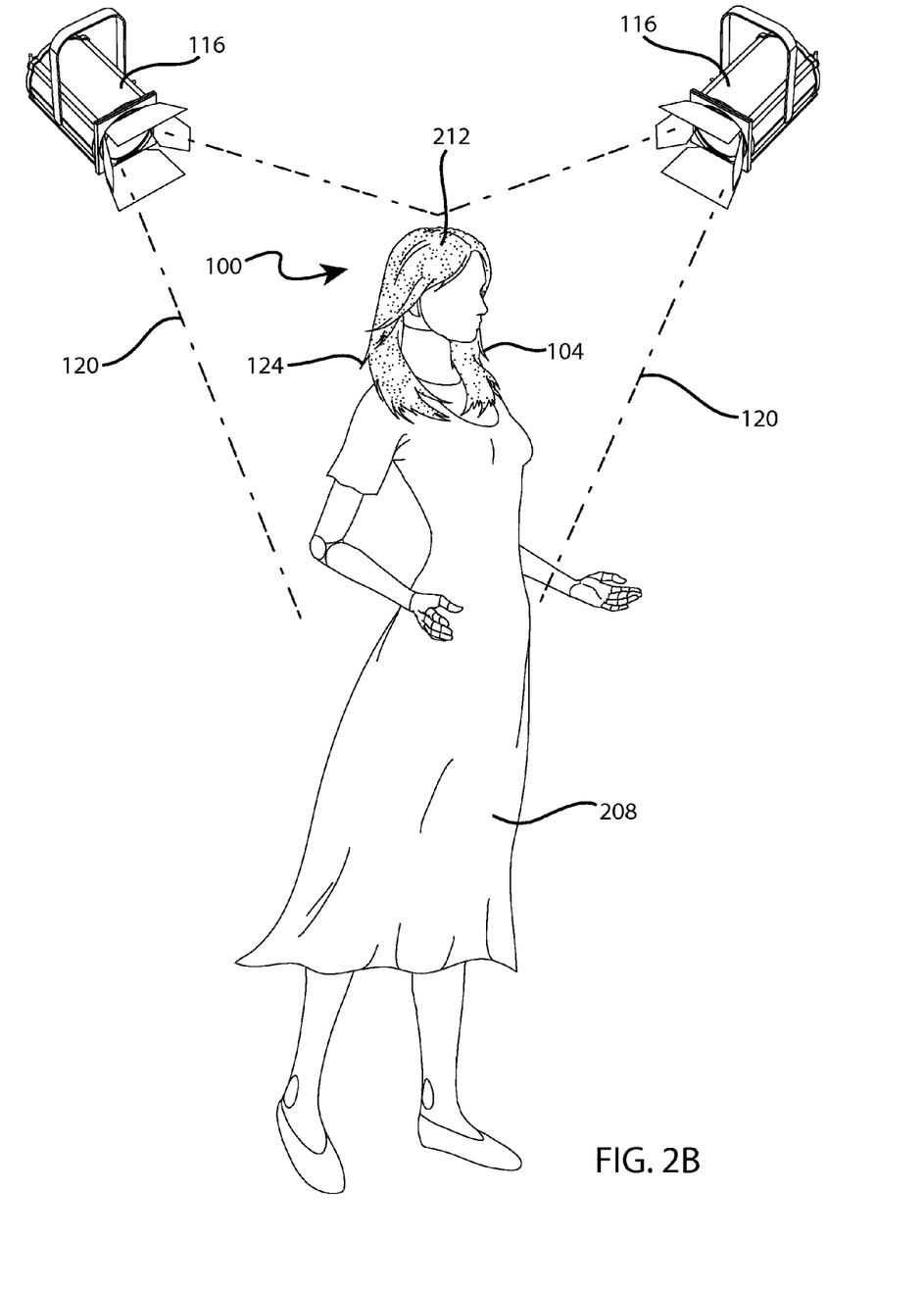
Figure 3:
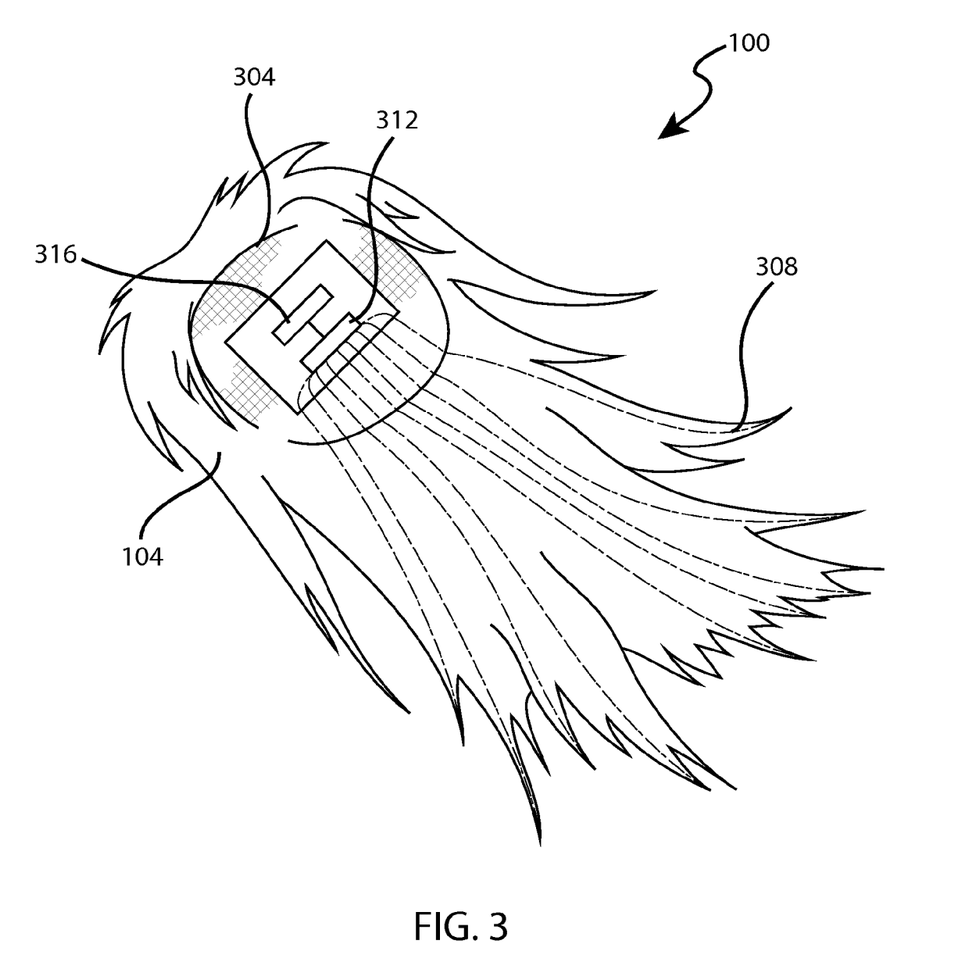
FIG. 3 is a perspective view of an underside of the hairpiece shown in FIGS. 1A-2B.

Turning to the figures, the color-changing hairpiece will now be discussed in more detail. FIGS. 1A-2B are perspective views of a hairpiece 100 in accordance with the present disclosure. The hairpiece 100 may include a plurality of individual strands interwoven or otherwise interconnected with each other so as to give the outward appearance of hair 104. In one example, the hairpiece 100 may take the form of a wig that may be worn by a person 108, such as shown in FIGS. 1A-1B, or perhaps by a mannequin 208, animatronic or other character, such as shown in FIGS. 2A-2B. Referring to FIG. 3, the individual strands of the hairpiece 100 may be interwoven in a cap portion 304 adapted to fit on the head or other body section of the wearer. In some instances, such as where the hairpiece 100 is intended for a mannequin 208, the hairpiece 100 may not necessarily include a cap portion 304. Rather, the individual strands of the hairpiece 100 may be directly connected to the head of the mannequin 208 so as to give the appearance of the mannequin's hair. By way of example and not limitation, this disclosure describes and illustrates hairpieces 100 that have the appearance of human hair. However, it should be appreciated that the techniques and structures discussed herein may also be applied to hairpieces that give the outward appearance of fur or hair for an animal, fictional character, or the like.

The hairpiece 100 may be generally configured to have a color changing functionality. As illustrated in FIGS. 1A and 2A, the hairpiece 100 may have a first state or mode in which the hair 104 appears to a viewer to be a first color 112. Control inputs received at the hairpiece 100 may cause the hairpiece 100 to shift between the first color mode and a second color mode. The second color mode of the hair piece 100 is illustrated in FIGS. 1B and 2B where the hair 104 appears to a viewer to be a second color 212. FIGS. 1A-2B additionally illustrate an external light source 116 that provides light 120 that falls on the hairpiece 100. Generally, the color of hairpiece 100 can be understood as that portion of the visible electromagnetic spectrum that is reflected or otherwise emitted from the hairpiece 100 when incident light falls on the hairpiece 100. Thus, in the first color mode, the hairpiece 100 reflects a first portion of the electromagnetic spectrum when the incident light 120 falls on the hairpiece so as to produce the first color 112. Similarly, in the second color mode, the hairpiece 100 reflects a second portion of the electromagnetic spectrum when the incident light 120 falls on the hairpiece so as to produce the second color 212.

A hairpiece 100 in accordance with the present disclosure may include a plurality of the color-changing strands 124 that implement the color-changing functionality of the hairpiece 100. The color-changing strands 124 may be photochromic in various embodiments. More specifically, the color-changing strands 124 may undergo a visible color change when exposed to electromagnetic radiation. This visible color change may occur due to a reversible photochemical reaction that is triggered when electromagnetic radiation within a particular frequency range is incident on an exposed surface or other area of the color-changing strand 124. This photochemical reaction may cause a shift in the strength or wavelength of an absorption band in the visible part of the electromagnetic spectrum. This shift in the absorption band may occur in the various color-changing strands 124 across the hairpiece 100 such that the overall color of the hairpiece 100 changes in response to the triggering electromagnetic radiation. In addition to the color-changing strands 124, the hairpiece 100 may include one or more non-color changing strands such as human hair, animal hair or synthetic fiber that is interwoven with the color-changing strands 124. Non-color changing strands may be included to give the hairpiece 100 a more realistic appearance or texture, or to add volume to the hairpiece 100. In some instances, the non-color changing strands may be omitted such that all of the individual strands of hairpiece 100 may be color-changing strands 124.

The photochromism exhibited by the color-changing strands 124 may be achieved by a photochromic dye or other compound that is incorporated in the color-changing strand 124. In accordance with various embodiments, the photochromic compound incorporated in the color-changing strand 124 may be selected, as appropriate, from one or more of the recognized classes of photochromic compounds such as azastilbenes, naphthopyrans, triarylmethanes, nitrones, spiropyrans, stilbenes, spiro-oxazines, quinones, fulgides, and so on. Generally, the photochromic compound selected will be one that, when exposed to light, undergoes a photochemical process that results in a perceptible color change. Examples photochemical process that the photochromic compound may undergo include, without limitation, oxidation-reduction, cis-trans isomerizations, intramolecular hydrogen transfer, pericyclic reactions, dissociation processes, intramolecular group transfers, and the like. In some implementations, a hairpiece 100 in accordance with the present disclosure may be formed by applying a photochromic compound in the form of a photochromic dye to hair strands of a wig or other hairpiece. The hair strands may be made form of human hair, animal hair or synthetic fiber. The photochromic dye may be applied by in any convenient manner, such as by spraying or brushing the dye onto the hair strands, immersing the hair strands in the dye, and so on. Once applied, the photochromic dye forms a photochromic coating or layer on the various hair strands of the wig.

A pigment or other coloring may be incorporated in a color-changing strand 124 along with the photochromic dye or other photochromic compound. It may be the case that a particular photochromic compound incorporated in a color-changing strand 124 may not, by itself, produce a hair color that looks natural or that is intended for the hairpiece 100. Thus, the pigment may be included in the color-changing strand 124 so to produce a desired color for either or both of the first 112 and second 212 color. For example, the pigment may be chosen such the combination of a color of the pigment and a color of the photochromic dye when not activated produce the appearance of black or brown hair. Continuing with this example, the pigment may be further chosen such the combination of the color of the pigment and a color of the photochromic dye when activated produce the appearance of blonde hair. In other instances, a photochromic compound may be chosen that, by itself, produces the desired colors of the hairpiece 100. For example, the color of the photochromic dye when not activated may give the appearance of black or brown hair. Continuing with this example, the color of the photochromic dye when activated may give the appearance of blonde hair. In this case, the pigment may be omitted.

Referring to FIG. 3, a hairpiece 100 in accordance with the present disclosure may include one or more light sources 308 that trigger the hairpiece's 100 photochromism. The light sources 308 may be configured to provide a triggering electromagnetic radiation that is incident on a portion of one or more of the color changing strands 124. The light sources 308 may take the form of elongated light tubes or light guides that are integrated within the hairpiece 100. The light sources 308 may be configured to receive light from a light emitter 312, such as a diode (e.g., light emitting diode), lamp, or other component that this configured to produce light. The light sources 308 may be generally configured to receive light from the light emitter 312 and to convey the light along the length of the light source 308. In this regard, the light sources 308 may take the form of thin, optical cable or other optically transmissive material. The interior of the light sources 308 may be hollow in some locations so long as light is allowed to travel along the length of the light source 308. The light sources 308 may additionally include an exterior coating or other structure that internally reflects light at certain locations so as to keep the light within the light source 308. In some instances, the light source 308 may take the form a light tube that maintains the light within an interior portion until the light reaches the end of the tube where it is then outwardly emitted. In other instances, the light source 308 may take the form of a light guide that outwardly emits the light uniformly along the length of the light source. When a light source 308 of this type is used, a photochromic layer may be incorporated on the light source 308 itself so as to form a color-changing strand 124.

The light sources 308 may be configured to receive light from a light emitter 312, such as a diode, lamp, or other component that this configured to produce light. In some instances, the various individual light sources 308 that are included within the hairpiece 100 may receive light from a common light emitter 312. In other instances, one or more light sources 308 may each be associated with a dedicated light emitter 312. The light emitter 312 may be integrated with the hairpiece 100 such as by being disposed in the cap portion 304 of the hairpiece 100 as shown in FIG. 3. Alternatively, the light emitter 312 may be separate from the hairpiece 100. For example, the light emitter 312 may be disposed on a belt or other item of clothing worn by the wearer of the hairpiece 100. Here, light pipes or light extensions may extend between the hairpiece 100 and the light emitter 312. In implementations where the hairpiece 100 is associated with a mannequin 208, the light source light emitter 312 may be disposed in the interior of the head or other part of the mannequin 208.

Referring to FIGS. 4A-5B, the light sources 308 may be integrated within the hairpiece 100 so as to be generally adjacent one or more color-changing strands 124. Here, the color-changing strands 124 may take the form of a hairpiece strand 404 having an outer photochromic layer 408. The hairpiece strand 404 may be made from human hair, animal hair, synthetic fiber, or the like. The photochromic layer 408 may be a photochromic dye or other compound that is applied to hairpiece strand 404. The color-changing strand 124 may additionally include a pigment 412 that is mixed with or otherwise associated with the photochromic layer 408. The photochromic layer 408 and the pigment 412 may together produce the color of the hairpiece 100. Specifically, triggering light may be received from the light sources 308 and the color produced by the photochromic layer 408 and the pigment 412 may change so as to shift the hairpiece 100 between color modes.

Figure 4A:
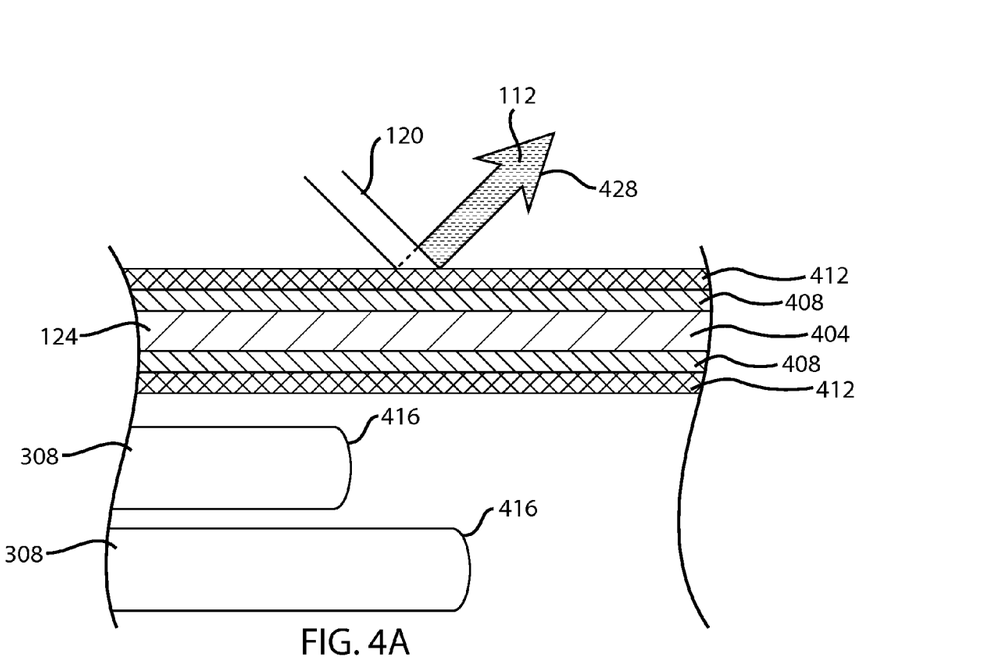
FIGS. 4A and 4B are cross sectional side views of a hairpiece implementation that includes one or more light sources generally adjacent to a color-changing strand.
Figure 4B:
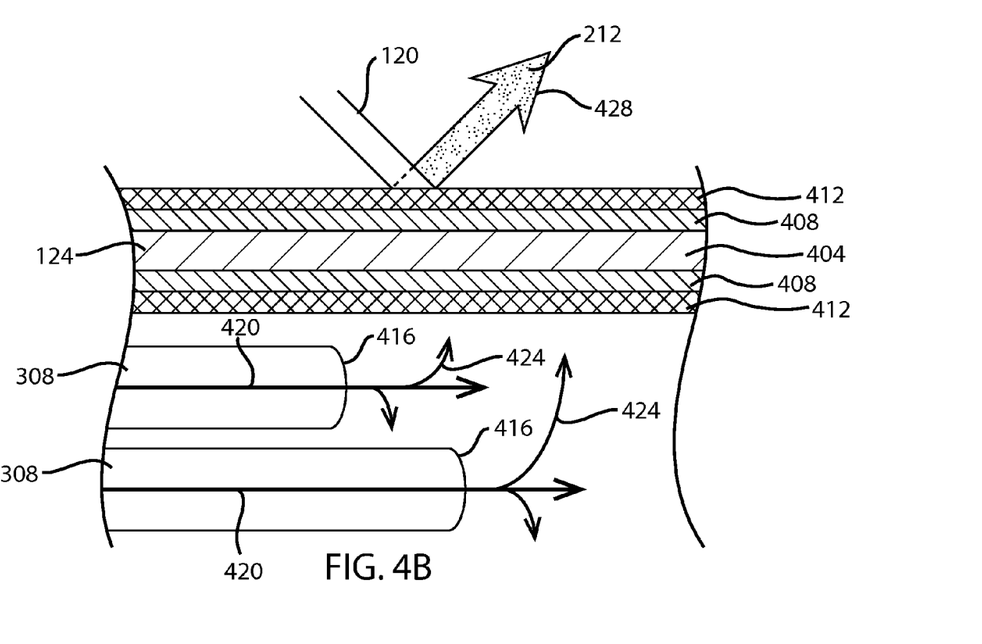

Referring to FIGS. 4A and 4B, a hairpiece 100 may include a color-changing strand 124 generally adjacent to a plurality of light sources 308 that emit light from a tip or end portion 416 of the light source 308. Here, the light sources 308 may take the form of light pipes that convey light without leakage along the length of the pipe such that substantially all of the light is emitted from the end portion 416. In FIG. 4A, the light source 308 is not activated such that the light emitter 312 that provides light to the light source 308 is off. In FIG. 4B, the light source 308 is activated such that the light emitter 312 that provides light to the light source 308 is on. Thus, as illustrated in FIG. 4B, light 420 may be received from the light emitter 312 and may generally travel along the length of the light source 308 to be emitted from the end portion 416. A portion of the light 420 emitted from the end portion 416 may then impinge on the color-changing strand 124. The portion of the light 420 impinging on the color-changing strand 124 is generally indicated with reference numeral 424. When light sources 308 of the type illustrated in FIGS. 4A and 4B are used, the color-changing strand 124 may be arranged within the hairpiece 100 so as to be adjacent a plurality of light sources 308 that have different lengths. Thus, as shown in FIG. 4B, light 424 from the various light sources 308 may impinge upon different areas of the color-changing strand 124 such that, together, the light sources 308 provide light to substantially the entire length of the color-changing strand 124.

Figure 5A:
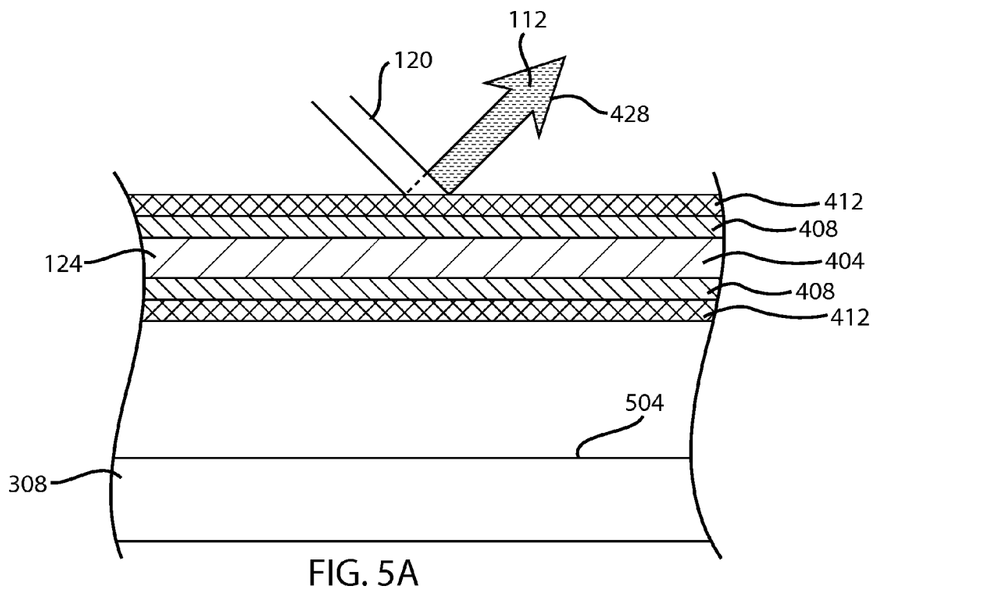
FIGS. 5A and 5B are cross sectional side views of another hairpiece implementation that includes one or more light sources generally adjacent to a color-changing strand.
Figure 5B:
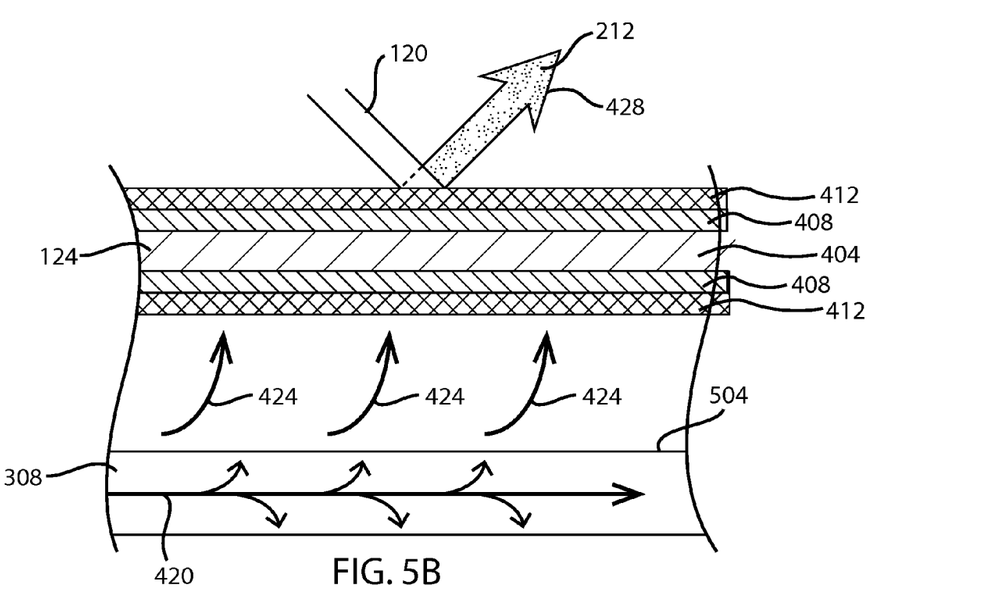

Referring to FIGS. 5A and 5B, a hairpiece 100 may include a color-changing strand 124 generally adjacent to a light source 308 that emits light along the length 504 of the light source 308. Here, the light source 308 may take the form of a light guide that is at least partially transmissive to light such that light 424 or a portion thereof is emitted radially outward as light 420 travels along the length 504 of the light source 308. In FIG. 5A, the light source 308 is not activated such that the light emitter 312 that provides light to the light source 308 is off. In FIG. 5B, the light source 308 is activated such that the light emitter 312 that provides light to the light source 308 is on. Thus, as illustrated in FIG. 5B, light may be received from the light emitter 312 and may be outwardly emitted as it travels along the length 504 of the light source 308. The light 424 or a portion thereof that is emitted along the length 504 of the light emitter 308 may then impinge on the color-changing strand 124. Thus, as shown in FIG. 5B, light 424 from the light source 308 may impinge upon the length of the color-changing strand 124 so as to provide light to substantially the entire length of the color-changing strand 124.

Figure 6A:
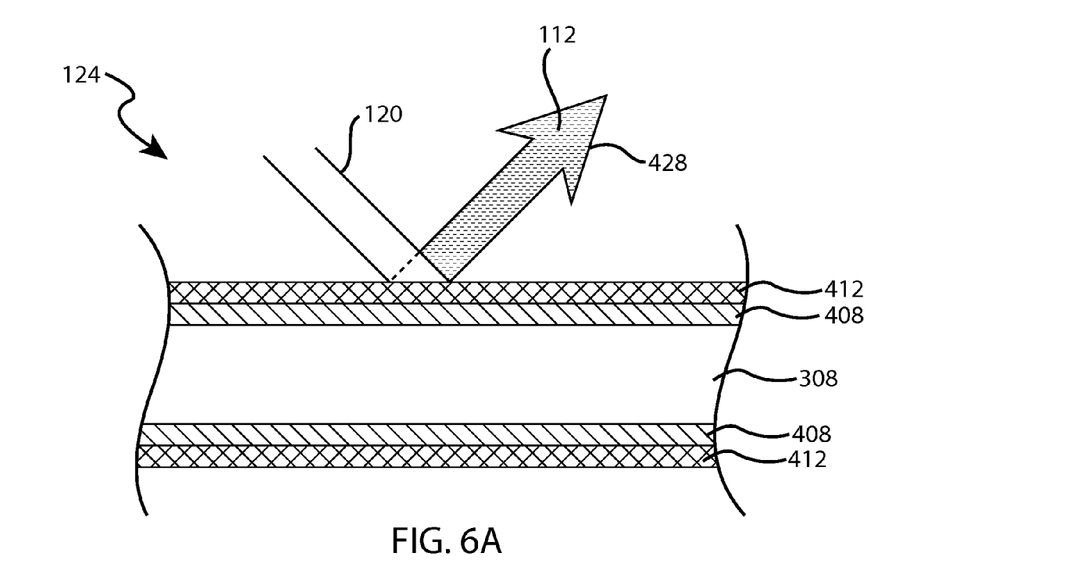
FIGS. 6A and 6B are cross sectional side views of a hairpiece implementation that includes a light source that forms a portion of a color-changing strand.
Figure 6B:
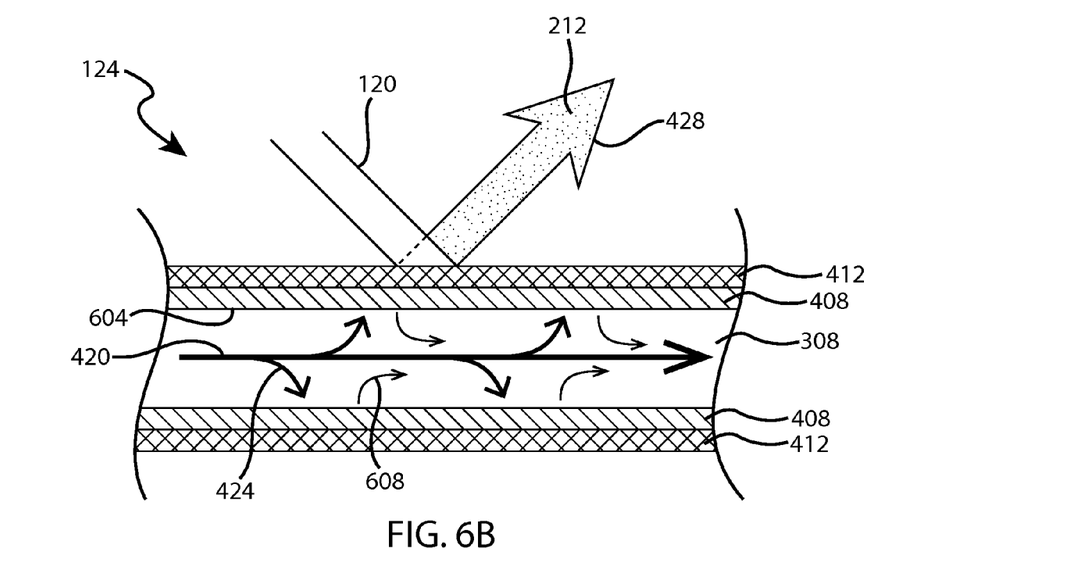

Referring to FIGS. 6A and 6B, a hairpiece 100 may include a light source 308 that forms a portion of a color-changing strand 124. Here, a color-changing strand 124 may include a light source 308 in the form of an elongated light guide having an outer photochromic layer 408. The photochromic layer 408 may be a photochromic dye or other compound that is applied to the light source 308. The color-changing strand 124 may additionally include a pigment 412 that is mixed with or otherwise associated with the photochromic layer 408. The photochromic layer 408 and the pigment 412 may together produce the color of the hairpiece 100. Specifically, triggering light may be received from the light sources 308 and the color produced by the photochromic layer 408 and the pigment 412 may change so as to shift the hairpiece 100 between color modes.

A light source 308 of the type illustrated in FIGS. 6A and 6B may be a light guide that is at least partially transmissive to light such that light 424 or a portion thereof is emitted radially outward as light travels along the length 504 of the light source 308. In FIG. 6A, the light source 308 is not activated such that the light emitter 312 that provides light to the light source 308 is off. In FIG. 6B, the light source 308 is activated such that the light emitter 312 that provides light to the light source 308 is on. Thus, as illustrated in FIG. 6B, light 420 may be received from the light emitter 312 and may generally travel along the length 504 of the light source 308. The light source 308 may be configured to be at least partially transmissive to light along the length 504 of the light source 308. Thus, as the light 420 from the light emitter 312 travels along the length 504 of the light source 308, some portion thereof may be emitted radially outward form the light source 308. This outward emission of light is generally indicated with reference numeral 424. As a consequence of the structure of the color-changing strand 124, once the light 424 is outwardly emitted, this light 424 may be impinge on an inwardly facing surface or other portion 604 of the photochromic layer 408.

A hairpiece 100 in accordance with the present disclosure may be generally configured such that light 424 that is emitted by a light source 308 and that impinges on a photochromic layer 408 may trigger a color change in the photochromic layer 408. In implementations such as those shown in FIG. 4A-5B, the triggering light 424 may be emitted from a light source 308 in the form of a light guide or light tube that is adjacent to a color-changing hair strand 124 having a photochromic layer 408. In implementations such as that of FIGS. 6A and 6B, the triggering light 424 may be emitted from a light source 308 in the form of a light guide that forms an interior portion of the color-changing strand 124. In each of these various embodiments, the color change that is triggered in the photochromic layer 408 may occur in the other color-changing strands 124 and thus may be repeated across the entire hairpiece 100. The color changes that occur in the various color-changing strands 124 may then, in the aggregate, produce an overall change in the color of the hairpiece 100. The overall color change that is produced in the hairpiece 100 is generally illustrated in FIGS. 1A-2B. In FIGS. 1A and 2A, the absence of triggering light 424 results in the photochromic layer 408 producing a first color, as indicated by reference numeral 112. In FIGS. 1B and 2B, the presence of triggering light 424 results in the photochromic layer 408 producing a second color, as indicated by reference numeral 212.

A hairpiece 100 in accordance with the present disclosure may additionally be configured to change between the first 112 and second 212 colors responsive to triggering light 424 from the internal light sources 308 and not from external light 120 that falls on the hairpiece from external light sources 116. Here, the photochromic layer 408 may be configured to be responsive to electromagnetic radiation in frequencies ranges that are not found in the external light 120 used to illuminate the hairpiece 100. Indoor lighting or other sources of artificial light that may be used to illuminate the hairpiece 100 typically include a narrow band of frequencies that do not include certain frequencies found in natural sunlight. For example, artificial lights typically exclude the ultraviolet frequency range. Thus, in one implementation, the photochromic layer 408 may be configured to be responsive to electromagnetic radiation in the ultraviolet frequency range. Further, the internal light sources 308 may be configured to emit light (or more generally electromagnetic radiation) in the ultraviolet frequency range. Thus, while the color of the hairpiece 100 remains unaffected by the external light 120 that falls on and thus illuminates the hairpiece 100, the internal light sources 308 may be turned on and off so as to change color of the hairpiece 100. In this way, the hairpiece 100 may be placed in either of the color modes in an indoor setting without the ambient light causing an unwanted color change in the hairpiece 100.

Referring to FIGS. 4A-6B, a hairpiece 100 configured to be responsive only to internally generated light is explained in greater detail. In FIGS. 4A-6B, the use of internal external light 120 from artificial light source 116 falls on or is otherwise is incident on an individual color-changing strand 124 of a hairpiece 100 in accordance with the present disclosure. This external light 120 may then result in external light 428 being emitted and/or reflected from the color-changing strand 124 as a consequence of the external light 120 falling on the color-changing strand 112. Generally, the color of this reflected external light 428 will correspond to the color that a viewer perceives when the viewer looks at the hair 104. The color of the reflected external light 428 will depend, at least in part, on the absorption spectrum of the photochromic layer 408. As mentioned, the absorption spectrum of the photochromic layer 408 changes in response to changes in the triggering light 424 emitted from light sources 308 and that impinges on the photochromic layer 408. The photochromic layer 408 may be configured to be responsive to triggering light 424 of a specific frequency, such as ultraviolet light, that is not included in external light 120. Thus, in the absence of the triggering light 424 and as in FIGS. 4A, 5A, and 6A, the photochromic layer 408 has one absorption spectrum. In the presence of triggering light 424 as in FIGS. 4B, 5B and 6B, the photochromic layer 408 has another absorption spectrum. Thus, as the absorption spectrum of the photochromic layer 408 changes, the color of the externally reflected light 428 and thus the overall color of the hair 104 changes. This overall color change of the hair 104 occurs even in the presence of an external light source 116.

A hairpiece 100 in accordance with the present disclosure may additionally be configured such that light generated by the internal light sources 308 remains invisible outside of the hairpiece 100. Here, the internal light sources 308 generate light that servers to trigger the photochromism of the hairpiece, but cannot be seen by a viewer of the hairpiece 100. In one respect, a hairpiece 100 in accordance with this embodiment may include a photochromic layer 408 triggered by internal light sources 308 that emit light imperceptible by the human visual system. For example, the photochromic layer 408 may be configured to be trigged by certain invisible ultraviolet frequencies ranges. The configuration illustrated in FIGS. 6A and 6B may also be used to implement a hairpiece 100 where light generated by the internal light sources 308 remains invisible outside of the hairpiece 100. Here, the color changing strand 124 may be configured such that any light 424 not absorbed by the photochromic layer 408 is reflected back into the interior light source 308. This internal reflection of light is generally indicated by reference number 608. Thus, the light emitted by the internal light source 308 remains invisible because this light is either absorbed by the photochromic layer 408 or is internally reflected. One advantage of a hairpiece 100 in accordance with this embodiment is that a transition between the first color 112 and the second color 212 can occur in the dark without being detected. For example, in the context of a stage performance, the stage lights 116 may be darkened while the hairpiece 100 shows the first color 112. With the stage dark, the internal light sources 308 may be imperceptivity activated to transition the hairpiece 100 to the second color 212. When the stage lights 116 are turned on, the hairpiece 100 then shows the second color 212.

The light source 312 is generally configured to switch between on and off states in response to operator input or in response to pre-programmed timing or scripting. As illustrated in FIG. 3, a switch 316 may be integrated with the hairpiece 100 such as by being disposed in the cap portion 304 of the hairpiece 100 as shown in FIG. 3. Alternatively, the switch 316 may be separate from the hairpiece 100. For example, the switch 316 may be disposed on a belt or other item of clothing worn by the wearer of the hairpiece 100. Here, wired or wireless connections may extend between the hairpiece 100 and the switch 316. In implementations where the hairpiece 100 is associated with a mannequin, switch 316 may be disposed in the interior of the head or other part of the mannequin.

Figure 7A:
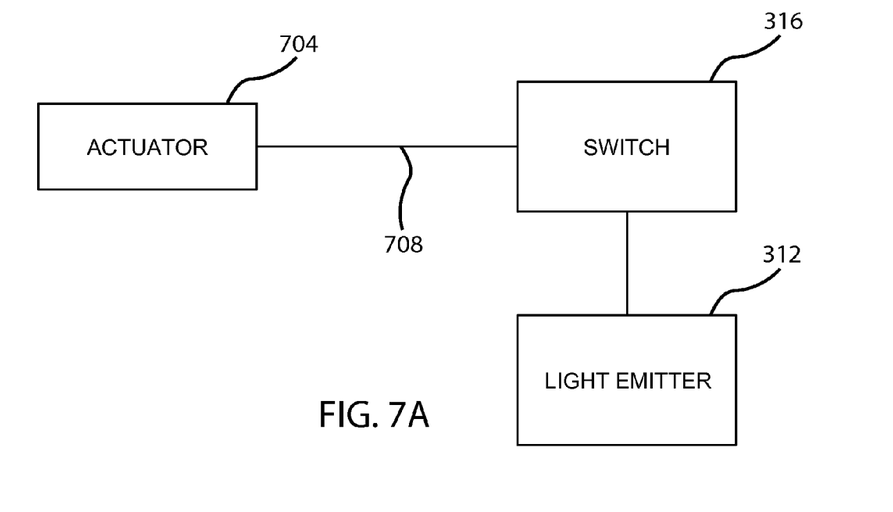
FIGS. 7A and 7B are schematic illustrations of a hairpiece implementation controlled by input from an operator.
Figure 7B:
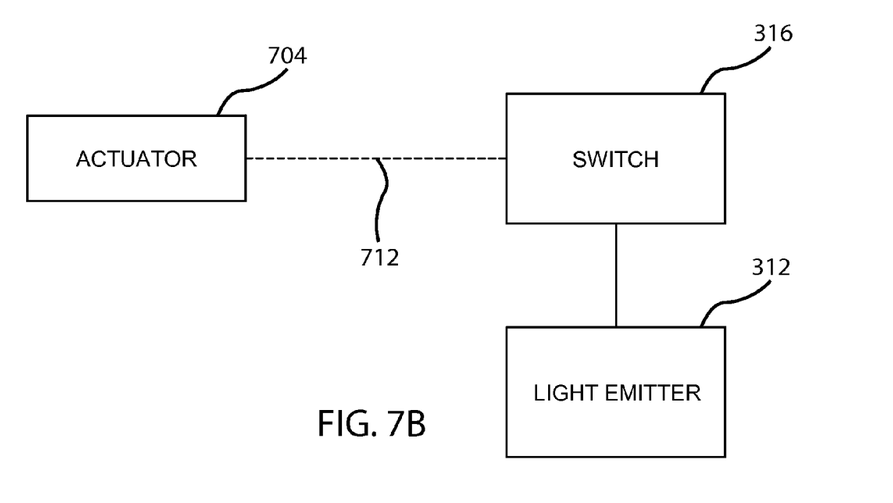

FIGS. 7A and 7B are schematic illustrations of embodiments in which the switch 316 and therefore the light source 312 is controlled by input from an operator. Here, the switch 316 may be provided in association with an actuator 704 that may be controlled by an operator to turn the switch 316 on and off. The actuator 704 may be configured to have at least two positions such as on and off. In accordance with various embodiments, the actuator 704 may take the form a button, a dial, a switch, or the like. As shown in FIG. 7A, the actuator 704 may control the switch 316 from across a wired connection 708. Alternatively, as shown in FIG. 7B, the actuator 704 may control the switch 316 from across a wireless connection 712.

In some cases, the operator of the actuator 704 may be the person 108 who wears the hairpiece 100 as a wig. Here, the wearer 108 of the hairpiece 100 may hold the actuator 704 in her hand or the actuator 704 may be placed in a pocket or otherwise attached to an article of clothing. In order to change the color of the hairpiece 100, the wearer 108 toggles or otherwise actuates the actuator 704, which then sends a control signal across a wired 708 or wireless connection 712 to the switch 316. In other cases, the operator of the actuator 704 may not be the same person as the wearer of the hairpiece. For example, in a stage play or other context where the hairpiece 100 is worn by an actress, the actuator 704 may be operated by a stage director or other crew member such the actress is free to concentrate on choreography or other stage tasks.

Figure 8A:
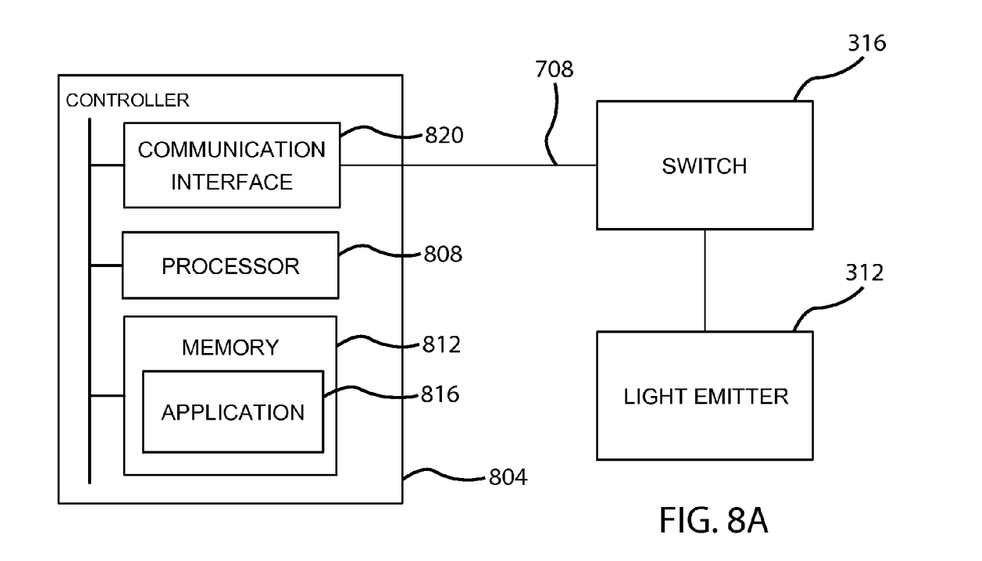
FIGS. 8A and 8B are schematic illustrations of a hairpiece implementation controlled by input from a controller.
Figure 8B:
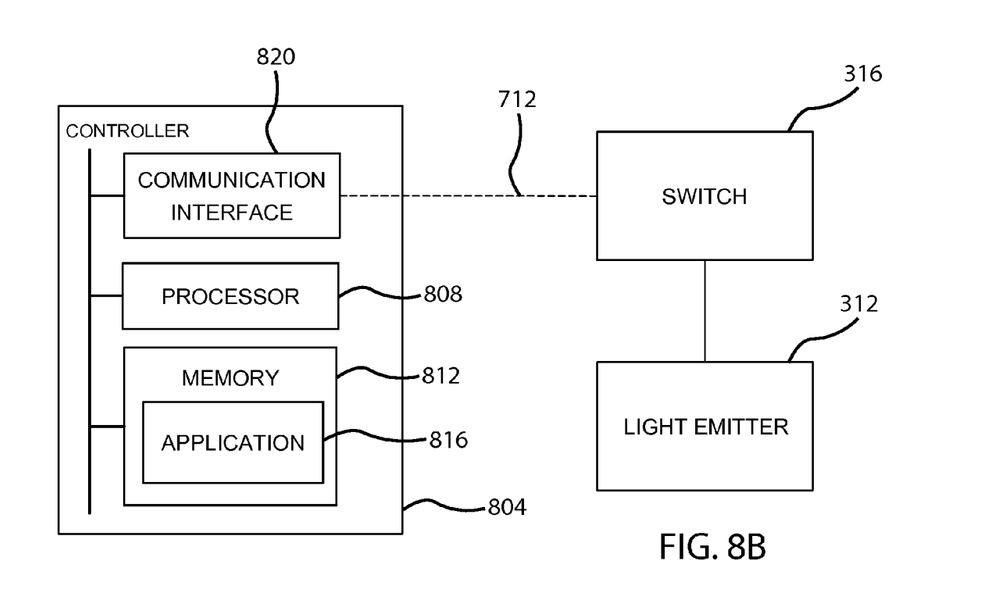

FIGS. 8A and 8B are schematic illustrations of embodiments in which the switch 316 and therefore the light source 312 is controlled by pre-programmed timing or scripting. Here, the switch 316 may be provided in association with a controller 804. The controller 804 may include a processor 808 provided in association with a memory 812. The memory 812 may include one or more applications 816. Responsive to the programming of the application 816, the controller 804 may provide output that controls the switch 316. As shown in FIG. 8A, the controller 804 may control the switch 316 from across a wired connection 708. Alternatively, as shown in FIG. 5B, the controller 804 may control the switch 316 from across a wireless connection 712.

Figure 9:
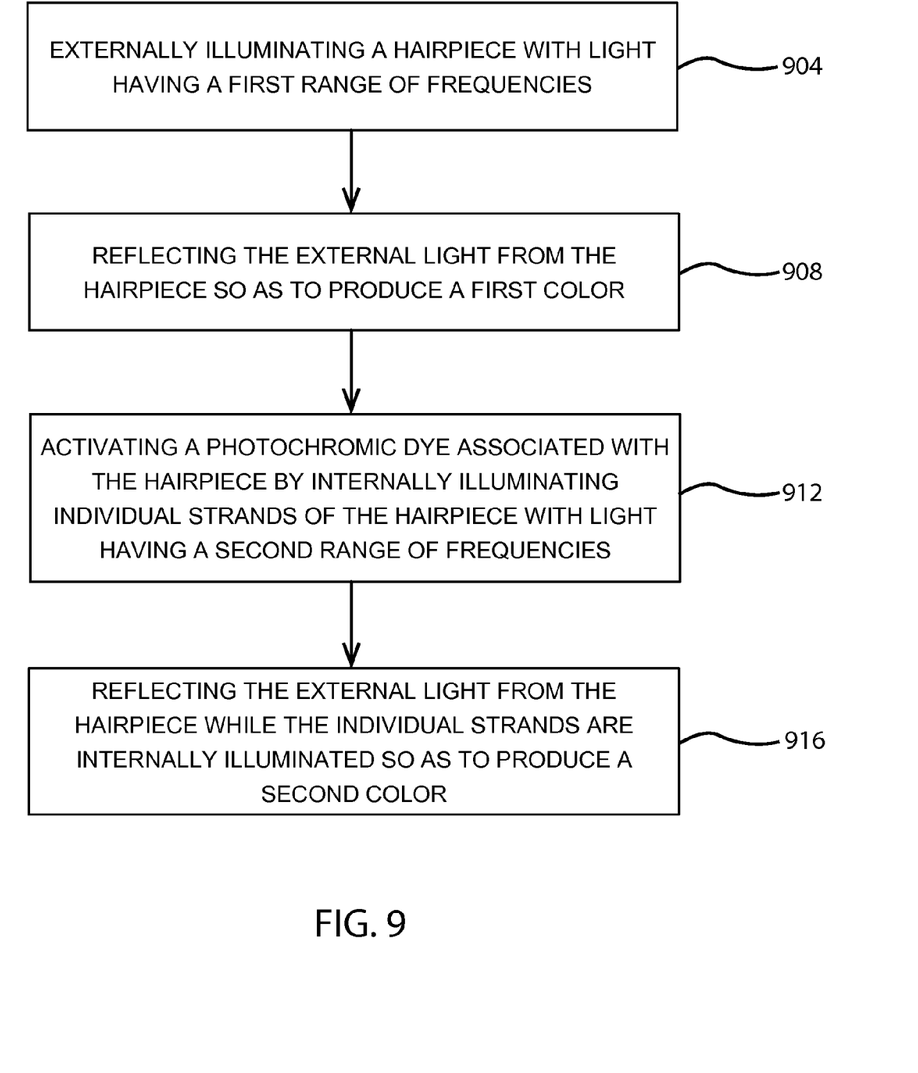
FIG. 9 is flow chart that illustrates a method of using hairpiece in accordance with present embodiments.

FIG. 9 is flow chart that illustrates a method of using hairpiece 100 in accordance with present embodiments. Initially, in operation 904, a hairpiece 100 is externally illuminated with light having a first range of frequencies. For example, as shown in FIGS. 1A and 1B, the hairpiece 100 may be worn by a person such as an actress 108. The actress 108 may the wear the hairpiece 100, for example, as part of a stage play or other performance. By way of further example, as shown in FIGS. 2A and 2B, the hairpiece 100 may be worn by a mannequin 208, which may include an animatronic figure. The mannequin 208 may the wear or otherwise be associated with the hairpiece 100, for example, as part of an automated stage play or similar performance. An external light source 116 may provide illumination in the form of light 120 that falls on various objects including hairpiece 100. The external light source 116 may exclude certain frequencies such as those in ultraviolet range.

In operation 908, the external light from the hairpiece 100 is reflected so as to produce a first color. Because the external light source 116 excludes certain frequencies such as those in ultraviolet range, the photochromic property of the hairpiece 100 is not triggered by the light 120 from the external source 116. Thus, in operation 908, the external light reflected or otherwise emitted from the hairpiece 100 is a first color 112, which may correspond to the photochromic property of the hairpiece 100 not being activated. The light reflected in operation 908 is shown in greater detail in FIGS. 4A, 5A, and 6A, which show both the incident 120 and reflected 428 light in diagrammatic form.

In operation 912, a photochromic dye or layer 408 associated with the hairpiece 100 is activated by internally illuminating individual strands 124 of the hairpiece 100 with light 424 having a second range of frequencies. More specifically, light 424 from light sources 308 that are internal to the hairpiece 100 impinge on the color-changing strands 124, with or without the presence of external light 120. This light 424 may include certain frequencies, such as those in the ultraviolet range, that trigger the photochromism of the hairpiece 100. Referring to FIG. 4A-5B, the triggering light 424 may be emitted from a light source 308 adjacent to a color-changing hair strand 124 having a photochromic layer 408. Alternatively, referring to FIGS. 6A and 6B, the triggering light 424 may be emitted from a light source 308 that forms an interior portion of the color-changing strand 124.

In operation 916, the external light from the hairpiece is reflected while the individual strands are internally illuminated so as to produce a second color. Because the light 424 from light sources 308 includes certain frequencies such as those in ultraviolet range, the photochromic property of the hairpiece 100 may be triggered. Thus, in operation 916, external light reflected or otherwise emitted from the hairpiece 100 is a second color 212, which corresponds to the photochromic property of the hairpiece 100 being activated. The light reflected in operation 916 is shown in greater detail in FIGS. 4B, 5B, and 6B, which show both the incident 120 and reflected 428 light in diagrammatic form.

It should be noted that in some embodiments the wig or hairpiece may include two types of photochromic dyes corresponding to separate light emitters or sharing certain light emitters. In these embodiments, the hairpiece may have three different color states, one when the light emitters are deactivated, one when the first photochromic dye is activated, and one when the second photochromic dye is activated. Optionally, a fourth color may also be included that is the result of the both dyes being activated simultaneously such that the combination of the two colors creates a fourth color.

Conclusion

In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A hairpiece, comprising:
   a plurality of elongated light sources that emit light when activated; and
   a photochromic layer formed on an outer surface of at least one light source of the plurality of elongated light sources such that the light emitted from the at least one light source impinges on an inwardly facing portion of the photochromic layer, wherein the photochromic layer changes color in response to the light emitted from the at least one light source.

2. The hairpiece of claim 1, further comprising:
   a second photochromic layer arranged on a hair strand that is generally adjacent to the at least one light source.

3. The hairpiece of claim 2, wherein light emitted from an end portion of the light source impinges on the photochromic layer arranged on the hair strand.

4. The hairpiece of claim 2, wherein light emitted along a length of the light source impinges on the photochromic layer arranged on the hair strand.

5. The hairpiece of claim 1, wherein light emitted from the at least one light source that is not absorbed by the photochromic layer is internally reflected within the at least one light source.

6. The hairpiece of claim 1, further comprising:
   an ultraviolet light emitter connected to the plurality of elongated light sources and configured to provide ultraviolet light when engaged so as to activate the elongated light sources.

7. The hairpiece of claim 6, further comprising:
   a switch that is manually actuated by an operator from across a wired connection to engage the light emitter.

8. The hairpiece of claim 6, further comprising:
   a switch that is manually actuated by an operator from across a wireless connection to engage the light emitter.

9. The hairpiece of claim 6, further comprising:
   a switch that is automatically actuated by a computerized program to engage the light emitter.

10. The hairpiece of claim 1, wherein
    the photochromic layer includes a photochromic dye that reflects a first color when the at least one light source is not activated, the first color being a color of the photochromic dye when the at least one light source is not activated; and
    the photochromic dye reflecting a second color when the at least one light source is activated, the second color being a color of the photochromic dye when the at least one light source is activated.

11. The hairpiece of claim 1, further comprising:
    a pigment associated with the photochromic layer; wherein
    the photochromic layer includes a photochromic dye that produces a first color when the at least one light source is not activated, the first color being a combination of a color of the pigment and a color of the photochromic dye when the at least one light source is not activated; and
    the photochromic dye produces a second color when the at least one light source is activated, the second color being a combination of the color of the pigment and a color of the photochromic dye when the at least one light source is activated.

12. The hairpiece of claim 1, further comprising:
    a wearable cap portion through which first ends of at least the plurality of elongated light sources are interconnected.

13. The hairpiece of claim 1, wherein first ends of at least the plurality of elongated light sources are connectable to a head portion of a mannequin.

14. A wig, comprising:
    a plurality of elongated light sources that emit light when activated;
    a wearable cap portion through which first ends of at least the plurality of elongated light sources are interconnected; and
    a photochromic layer formed on an outer surface of at least one light source of the plurality of elongated light sources such that the light emitted from the at least one light source impinges on an inwardly facing portion of the photochromic layer, wherein the photochromic layer changes color in response to the light emitted from the at least one light source.

15. The wig of claim 14, further comprising:
    a light emitter connected to the plurality of elongated light sources and configured to provide light when engaged so as to activate the elongated light sources.

16. The wig of claim 14, further comprising:
    a second photochromic layer arranged on a hair strand that is generally adjacent to the at least one light source, wherein
    light emitted from an end portion of the light source impinges on the photochromic layer arranged on the hair strand.

17. The wig of claim 14, further comprising:
    a second photochromic layer is arranged on a hair strand that is generally adjacent to the at least one light source, wherein
    light emitted along a length of the light source impinges on the photochromic layer arranged on the hair strand.

18. A method, comprising:
    externally illuminating a hairpiece with light having a first range of frequencies;
    reflecting the external light from the hairpiece so as to produce a first color;
    activating a photochromic dye formed on an outer surface of an elongated light source integrated with the hairpiece by illuminating individual strands of the hairpiece with the elongated light source integrated with the hairpiece, the light source producing light having a second range of frequencies; and reflecting the external light from the hairpiece while the individual strands are illuminated by the elongated light source integrated with the hairpiece so as to produce a second color.

19. The method of claim 18, wherein
the first range of frequencies excludes ultraviolet light; and
the second range of frequencies includes ultraviolet light.

20. The method of claim 18, further comprising reflecting light not absorbed by the photochromic dye internally within the individual strands of the hairpiece.

* * * * *